United States Patent [19]

Gelhaar et al.

[11] 4,207,083

[45] Jun. 10, 1980

[54] DIFFUSER ASSEMBLY AND METHOD OF ASSEMBLING

[75] Inventors: Rolf Gelhaar, Weilrod; Werner Schwarzkopf, Butzbach, both of Fed. Rep. of Germany

[73] Assignee: Metallgesellschaft Aktiengesellschaft, Frankfurt am Main, Fed. Rep. of Germany

[21] Appl. No.: 902,163

[22] Filed: May 2, 1978

[30] Foreign Application Priority Data

May 3, 1977 [DE] Fed. Rep. of Germany ....... 2719676

[51] Int. Cl.$^{2}$ .......................... B03C 3/36; B01D 51/00

[52] U.S. Cl. .......................................... 55/129; 55/418; 98/40 V; 98/40 VM; 29/157 R; 29/418

[58] Field of Search ................. 55/125, 128, 129, 133, 55/418, 419; 52/220, 221; 98/40 C, 40 D, 114, 40 V, 40 VM; 29/157 R, 418

[56] References Cited

U.S. PATENT DOCUMENTS

| | | | |
|---|---|---|---|
| 752,418 | 2/1904 | Reilly | 55/419 |
| 1,888,606 | 11/1932 | Nesbit | 55/129 |
| 2,000,539 | 5/1935 | Scheide | 52/221 |
| 2,822,841 | 2/1958 | Huffman | 29/428 |
| 3,390,624 | 7/1968 | Averill | 98/114 |
| 3,990,871 | 11/1976 | Cooper | 55/129 |

FOREIGN PATENT DOCUMENTS

| | | | |
|---|---|---|---|
| 511913 | 6/1951 | Belgium | 55/129 |
| 520398 | 1/1956 | Canada | 55/128 |
| 319224 | 10/1918 | Fed. Rep. of Germany | 98/114 |
| 2618833 | 11/1977 | Fed. Rep. of Germany | 52/221 |

OTHER PUBLICATIONS

Making, Shaping and Treating of Steel, Ed. Harold E. McGannon, Ninth Edition, pp. 763–771.

*Primary Examiner*—David L. Lacey

*Attorney, Agent, or Firm*—Karl F. Ross

[57] ABSTRACT

A diffuser assembly for transition pieces between gas-processing apparatus and a gas line, e.g. between an inlet duct and an electrostatic precipitator, comprises a support structure in the form of an array of mutually parallel profile bars. The array has edge bars with inwardly open channels and the intermediate bars are I-profiles. The bars are spanned by perforated plates having edges formed with rectangular profiles received in the channels into which a plug connector can be fitted to retain a plate in contiguous relation within and between the profiled structural shapes. The resulting planar assembly is introduced into a diffuser between a gas duct and the processing apparatus.

9 Claims, 9 Drawing Figures

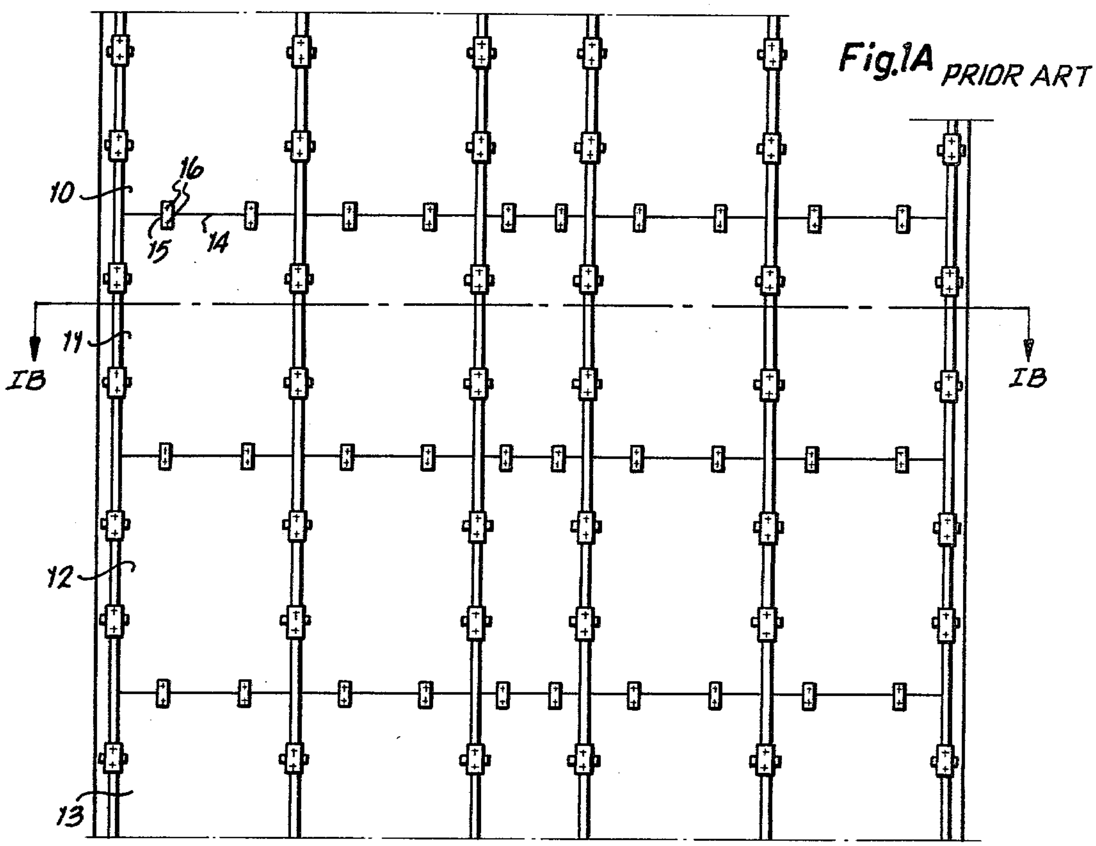
Fig.1A PRIOR ART
Fig. 1B
PRIOR ART
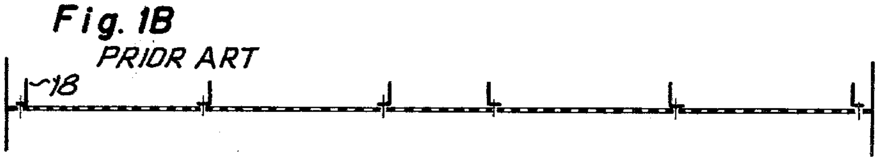
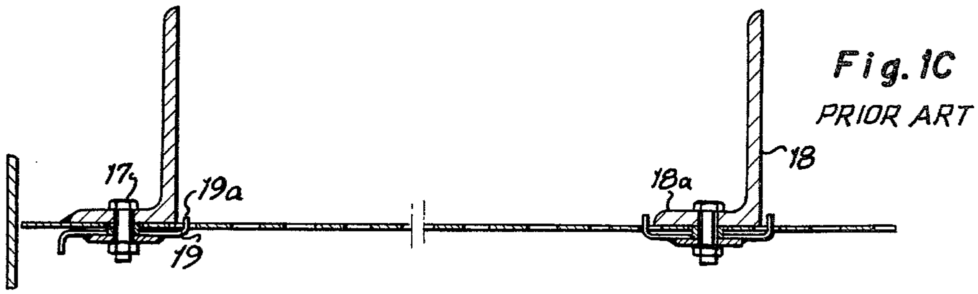
Fig. 1C
PRIOR ART

DIFFUSER ASSEMBLY AND METHOD OF ASSEMBLING

FIELD OF THE INVENTION

The present invention relates to a baffle assembly and, more particularly, to a gas-distributing structure, particularly for a device for distributing a gas between a duct of limited cross section and a substantially large inlet of a gas-processing apparatus such as an electrostatic precipitator.

BACKGROUND OF THE INVENTION

Baffling and gas-distributing structures are commonly used when it is necessary to disperse a gas stream over the entire cross section of a passage to which the gas is to be fed.

Particularly in gas-processing apparatus, such as electrostatic precipitators, it is necessary to feed the gas from a duct of relatively small cross section to a chamber or inlet of much larger cross section.

When the gas stream is to be uniformly distributed in such a system, the common technique is to provide a diffuser structure as a transition member between the gas duct and the processing apparatus, namely the electrostatic reciprocator. Such a diffuser provides a progressively increasing flow cross section.

Experience has shown that the uniform distribution of a gas stream in a progressively increasing cross section requires a distributing or baffling structure for redirection or establishment of flow lines when the angle of divergence exceeds a predetermined lower limit.

Expressly pronounced divergences are present in the feed devices to electrostatic precipitators and one can encounter an increase in the cross section of 15 times. It has been found to be necessary to provide distributors of this type with internal structures having the functions indicated.

Such gas-distributing structures generally consist of perforated panels, e.g. sheet metal walls punched with apertures, windows or openings, so that there is a certain ratio of opening cross section to baffle area. These panels are disposed at right angles to the gas flow and, where the cross section is large, each panel may be made up of plurality of contiguous plates secured by connectors to a carrying or support structure. The entire assembly is generally planar or flat and a plurality of such assemblies may be provided in spaced-apart relation.

The assemblies are generally oriented vertically with the support members also running vertically and the contiguous edges of the plates running horizontally.

The most common construction of such assemblies makes use of a bolted connection between the plates and the support members which are generally L-section structural shapes. Assembly at the site restricts the size of the profiled plate which can be used, as well as the weight thereof, and hence a large number of profiled plates and a correspondingly large number of connecting elements are required for large-cross section gas-distributing assemblies.

The assembly at the site is also expensive and time consuming, because each plate must be affixed to the adjacent plate and/or the support structures or framing elements at a plurality of locations each of which has a plurality of bolts. Efforts to prefabricate such structures and to minimize the number of strips required for on-site erection of the units have proved to be fruitless.

OBJECTS OF THE INVENTION

It is the principal object of the present invention to provide an improved gas-distributing assembly which is of simple construction, low cost and easily assemblied at the desired site.

Another object of the invention is to provide a gas-distributing assembly, especially for the diffuser feeding an electrostatic precipitator, which will obviate the disadvantages of the earlier systems mentioned previously.

Still another object of the invention is to provide an improved method of erecting a gas-distributing assembly for the purposes described.

Still another object of our invention is to provide a gas diffuser forming a transition between a small-cross section gas duct and a gas-processing apparatus of large cross-sectional area, e.g. an electrostatic precipitator which is of low cost, high efficiency and is readily maintainable.

SUMMARY OF THE INVENTION

These objects and others which will become apparent hereinafter are attained, in accordance with the present invention, in a gas-distributing assembly which comprises a plurality of mutually parallel profiled members (structural shapes) in transversely spaced relation, defining mutually open channels in a common plane. The perforated plates spanning each pair of channels are formed with polygonal profiles along the edges receivable in these channels and are retained in the channels by plug connectors which have polygonal plug formations complementary to and extending into the edge profiles of the plates. Each channel is defined between a pair of parallel shanks of the edge profile and a web perpendicular to the shanks. The plug formations extend perpendicular to plates of the connector and conform to the configuration of the channel and are received between the shanks and against the web thereof.

The object of the invention is thus accomplished by the provision of a set of components, in which the edge portions or the perforated plates are L-shaped in section on two opposite sides and U-shaped in section on the other two sides, the carrying elements consist of rolled I-profiles or structural shapes and rolled U-profiles or structural shapes and the perforated plates are connected to the rolled profiles only by plug connectors each of which consists of a square tubular member and a spacing plate, which is joined to the square tubular member at its ends or in the middle in a plane which is normal to the tube axis.

The transverse dimensions of the square tubular member are matched to the U-shaped edge portions of the perforated plates so that the tubular member is a clearance fit in said edge portion. The spacing plate substantially conforms in configuration and size to the inside cross-sectional surface of the rolled I-profiles and rolled U-profiles.

A gas-distributing structure can be assembled from components according to the invention in that rolled profiles are arranged and secured at locations which are uniformly spaced apart over the width of the gas passage, perforated plates in the number required for a lowermost course are placed between the rolled sections and are locked in the rolled sections by means of the plug connectors and the perforated plates for a second and for any additional course thereof which may be required are introduced between the rolled profiles and placed on the spacing plates associated with the next lower course and are locked by means of the plug connectors.

It is preferable to use rolled U-profiles for the outer carrying elements, which engages the boundary wall of the gas passage, and to use only rolled I-profiles elsewhere. The method can be further improved in that plug connectors having spacing plates secured to the square tubular member at the end thereof are used to lock the perforated plates at the lower and upper ends of the gas-distributing structure and plug connectors having intermediate spacing plates are used elsewhere.

BRIEF DESCRIPTION OF THE DRAWING

The above and other objects, features and advantages of the present invention will become more readily apparent from the following description, reference being made to the accompanying drawing in which:

FIG. 1A is an elevational view of a portion of a baffle assembly according to prior art teachings, with the perforations being shown only over part of the plate area, it being understood that such perforations extend uniformly over the entire plate area.

FIG. 1B is a cross-section view taken along the line IB—IB of FIG. 1A;

FIG. 1C is a detail view of the connection of the plates to the support in the system of FIGS. 1A and 1B;

SPECIFIC DESCRIPTION

Figure 2A:
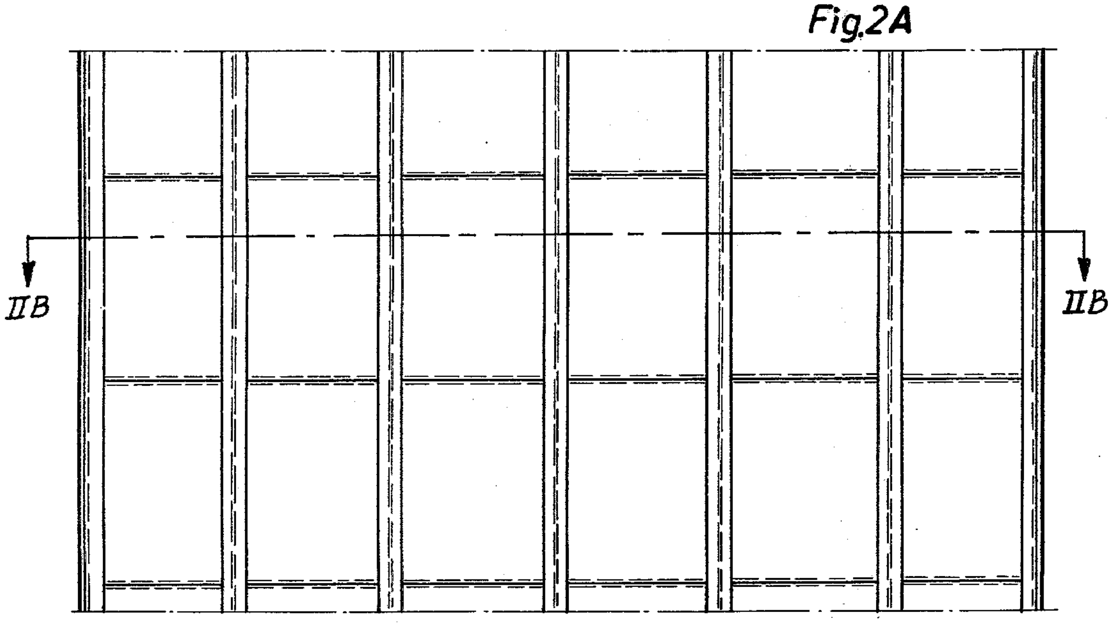
FIG. 2A is a view corresponding to FIG. 1A but illustrating the assembly of the present invention.

The baffle assembly shown in FIG. 1A through 1C represents the prior art and comprises a plurality of perforated plates 10, 11, 12 and 13 joined at their contiguous edges 14 by means of plates 15 traversed by screws 16. In addition, each plate is secured by bolts 17 to L-profiles 18. Positioning shims or lugs 19 with bent or angled edge portions 19*a* are also provided to hold the plates in position on the legs 18*a* of the profile 18.

Figure 2B:
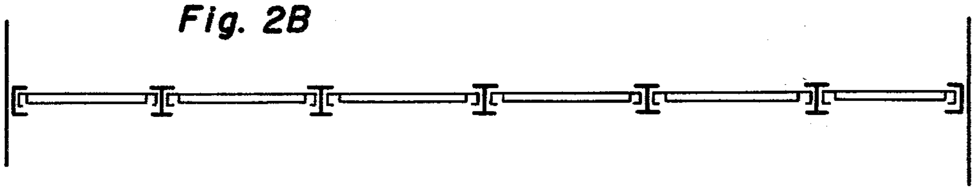
FIG. 2B is a view similar to FIG. 1B and corresponding to a cross section taken along IIB—IIB of FIG. 2A.
Figure 2C:
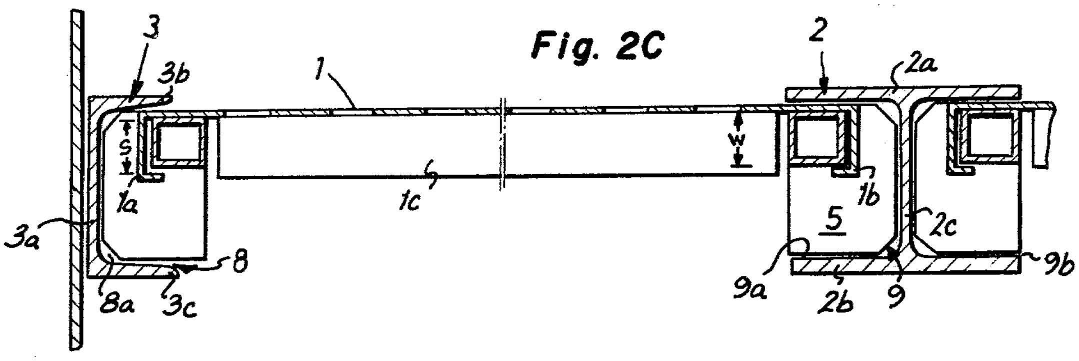
FIG. 2C is a detail cross-sectional view showing the relationship between the plates and the profile in the system of the present invention, drawn to a greatly enlarged scale.

To facilitate a direct comparison with FIGS. 1A–1C, a gas-distributing structure according to the invention is shown in FIGS. 2A–2C also in elevation, in a transverse sectional view, and an enlarged fragmentary view. In this case the carrying skeleton consists of upright I-profiles 2 and of U-profiles 3 on the sides. The free cross-sectional areas 8, 9 of the profiles 2, 3 constitute vertical guide spaces, in which perforated plates 1 of metal are inserted and secured by plug connectors 5. The vertical edge portions of the perforated plates 1 are U-shaped in cross-section and L-shaped in cross-section at their horizontal edges. The width of the perforated plates 1 matches the horizontal spacing of the profiles 2, 3 in such a manner that the perforated plates 1 can be slidably inserted in succession from above or each perforated panel 1 can be inserted with one vertical longitudinal edge into a profile 2 or 3 and is then swung into the second profile and finally fixed in the proper position by the plug connectors 5. During the last-mentioned method of assembling it is not necessary to lift each perforated plate above the top of the carrying skeleton. Besides, a perforated plate can be much more easily replaced in this manner. All of the profiles described are rolled structural elements which can be standard structural-steel shapes, e.g. channels and I-beams.

Figure 3:
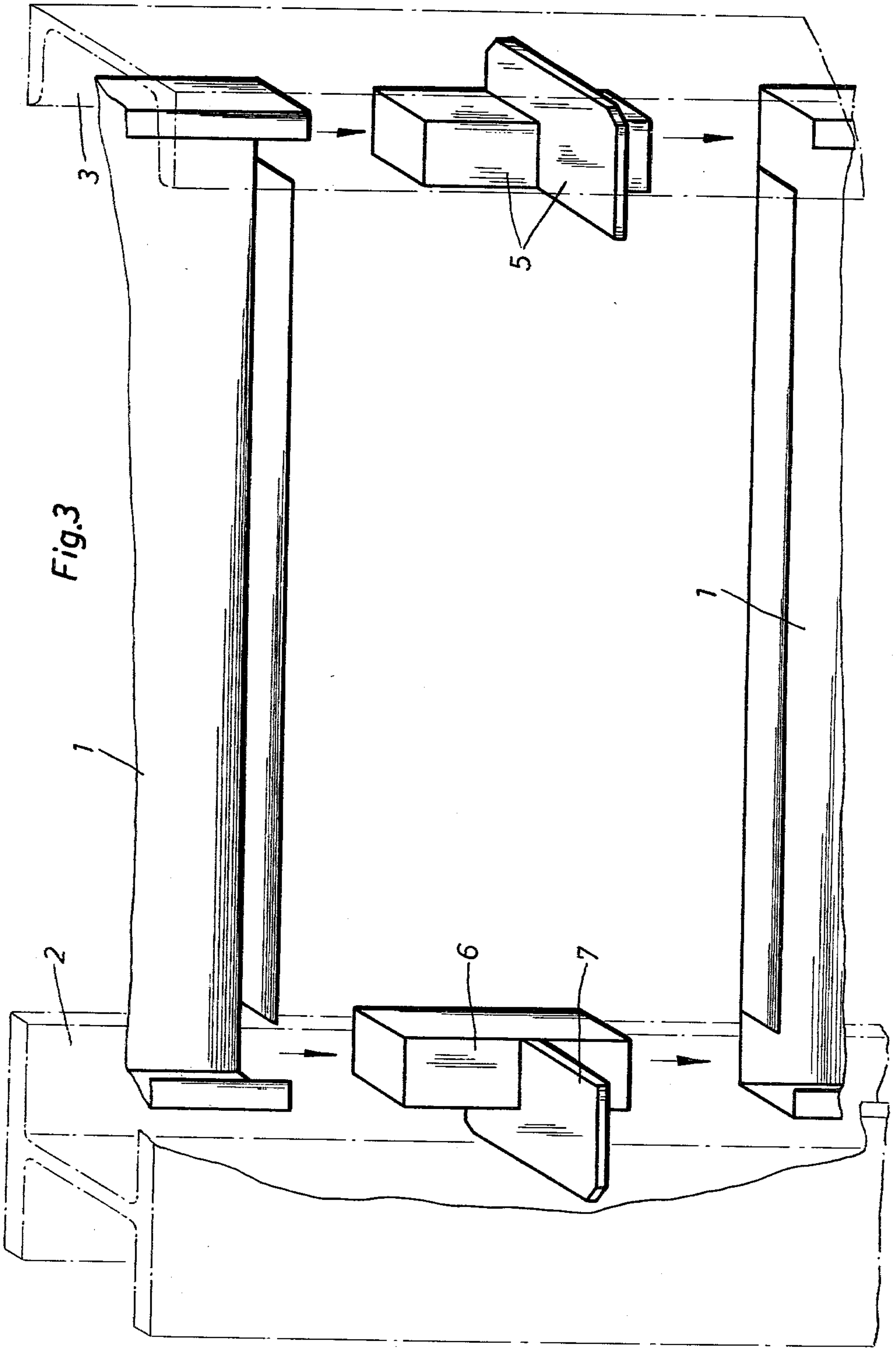
FIG. 3 is a somewhat diagrammatic exploited perspective view illustrating the assembly operations for the gas distributor of FIGS. 2A through 2C.
Figure 4:
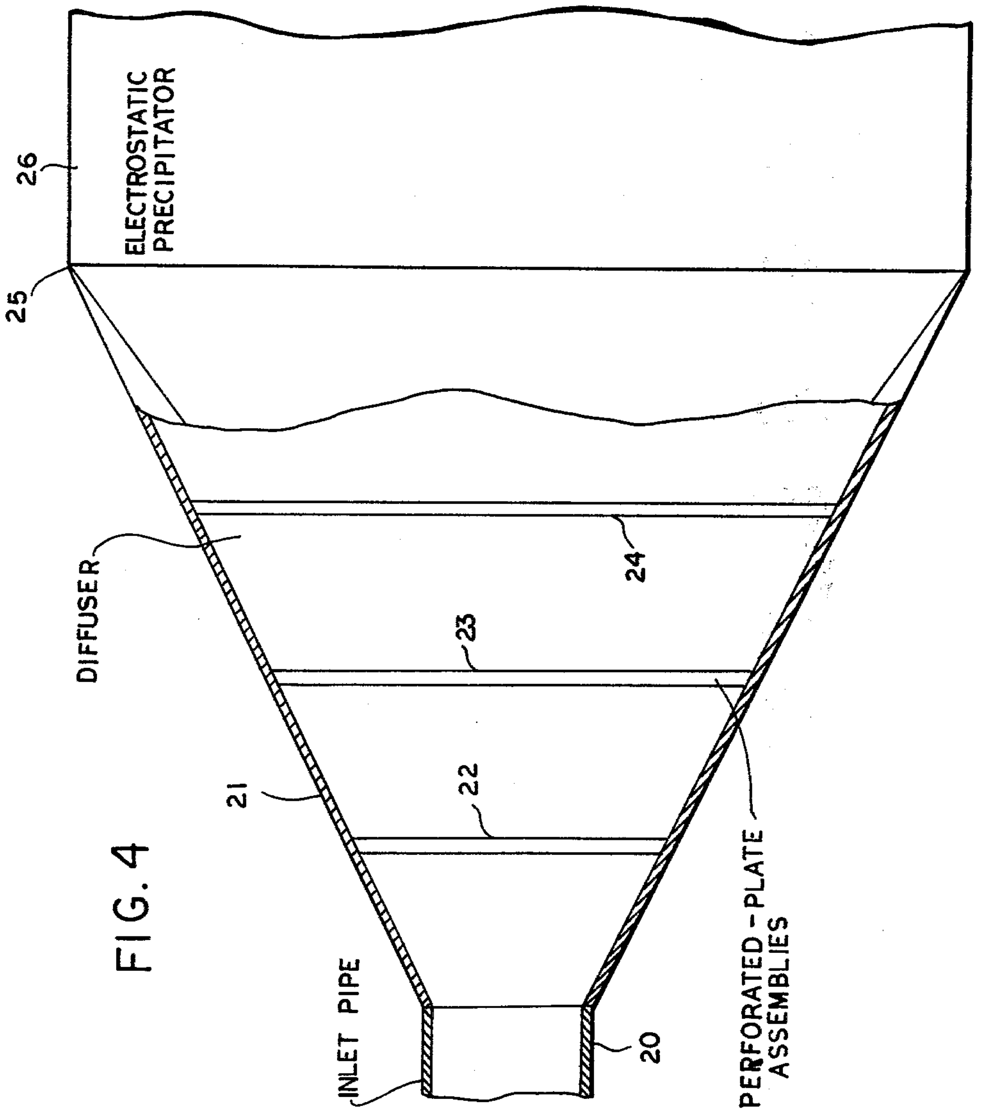
FIG. 4 is an elevational view, partly broken away through a diffuser at the inlet of an electrostatic precipitator according to the invention.

FIG. 4 shows the diffuser which is provided with three assemblies 22–24 in the transit piece 21 connecting the small-cross section inlet pipe 20 with the large-cross section inlet 25 of the electrostatic reciprocator 26. Each of the assemblies 22 through 24 has the configuration shown in FIGS. 2A through 3 and 5 of the drawing.

FIG. 3 is an enlarged fragmentary exploded view showing the components. Two plug connectors consisting each of a square tubular member 6 and a spacing plate 7 are provided on the right and left, respectively, between two perforated plates 1 and serve also to secure and align the latter in the profiles 2, 3, which are indicated only by dotted lines in that Figure. The square tubular member 6 extends into the U-shaped edge portions of the perforated plates 1. The spacing plate 7 ensures an alignment in the free cross-sectional areas of the profiles 2, 3 and provides a supporting surface for the upper perforated plate.

Each of the profiles 3 has a web 3*a* and a pair of shanks 3*b* and 3*c* defining a channel 8*a* of approximately trapezoidal profile. It is this channel 8*a* which has the cross section 8 mentioned previously.

Each I-beam 2 is provided with an upper flange 2*a* and a lower flange 2*b* bridged by a web 2*c* lying along a median longitudinal plane of the I-beam and defining two channels 9*a* and 9*b*, each with the cross section 9 therein.

Along each side of the assembly, a channel 8*a* confronts a channel 9*a* and is coplanar therewith. The channels 9*b* and 9*a* of the successive I-beams confront one another over the remainder of the assembly.

Each pair of confronting channels receives the profile b are generally L-profiles or, more properly of polygonal profiles with right angles so as to receive with limited dimensional tolerance the rectangular-section tubes 6 of the plug-type connectors 7. The tubes 6 are shown to have square cross sections with wall widths W approximately equal to the wall width S of the profiles 1*a* and 1*b*.

Figure 5:
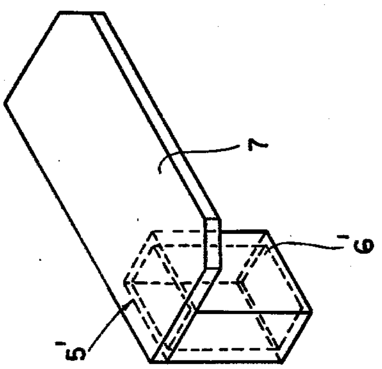
FIG. 5 is a perspective view of a plug-type connector for use in the assembly in the system of the present invention.

Inward movement of the plug-type connectors 5 is prevented by the downwardly turned flanges 1*c* at the contiguous edges of the plates 1. These flanges 1*c* are advantageously coplanar with the plates 7 of the plug connectors 5. The tubes 6 which can be welded to the plates 7, advantageously lie at one corner of the plate. In the embodiment of FIG. 5, a tube 6' lies only on one side of the plate 7, the connector 5' of this embodiment serving as the upper or lower end connector for the assembly.

All components according to the invention can be made in a workshop so that no bolting or welding operations are required on the site and the assembling is greatly facilitated and can be performed in shorter time.

We claim:

1. A gas-distributor assembly, especially for use in a divergent passage connecting a source of gas with a gas-processing apparatus, said assembly comprising:

a pair of end elongated structural-shape profiled bars having inwardly open channels, and a plurality of mutually spaced intermediate elongated structural-shape profiled bars having oppositely open channels and between and coplanar with said end profiled bars whereby pairs of channels confront one another, said profiled bars being parallel to one another, the channels of the end bars facing each other and one of the channels of one of said intermediate bars a plurality of perforated profiled plates spanning the mutually facing channels of each end bar and a respective intermediate bar and facing channels of the intermediate bars, said plates being formed with profiled edges received in respective channelss of each pair; and plug connectors mounting said plates on said profiled bars, said plug connectors each having a tubular member received in a respective profiled edge of one of said plates, and a transverse spacing member connected to said tubular member and received in the respective channels, said assembly being located in said gas passage.

2. The assembly defined in claim 1 wherein said tubular member is of square cross section and said spacing member is a plate perpendicular to the axis of said tubular member.

3. The assembly defined in claim 2 wherein two such tubular members project on opposite sides of each spacing member.

4. The assembly defined in claim 3 wherein said edge profiles are of generally U-section.

5. The assembly defined in claim 4 wherein the spacing plate substantially conforms to the free cross-sectional area of the channel in which it is received.

6. The gas distributor assembly defined in claim 1, said gas passage is the gas inlet passage to an electrastatic precipitator.

7. A method of assembling a gas-distributing assembly comprising the steps of:

(a) disposing an array of vertical, spaced-apart profiled bars in a horizontal plane in a gas passage, said profiled bars having pairs of channels confronting one another and spaced apart uniformly over the width of said gas passage, said bars including end bars on opposite sides of the array and intermediate bars between the end bars;

(b) inserting a perforated plate for a lower course between each pair of channels with respective profiled edges received in the channels of each pair;

(c) locking the plates of the lower course in the respective channels by plug connectors; and (d) then inserting perforated plates of a second course in said channels above the plates of the first course and at least partly locking them in place with the previously applied plug connectors.

8. The method defined in claim 7 wherein the end profiled bars are U-cross section while the intermediate profiled bars are I-cross section beams.

9. The method defined in claim 7, further comprising locking the uppermost and lowermost courses of said plates in the respective channels with said plug connectors which have plug formations on one side only of respective plates conforming to and received in respective channels.

* * * * *